US 6,710,497 B2

(12) United States Patent
Wang et al.

(10) Patent No.: US 6,710,497 B2
(45) Date of Patent: Mar. 23, 2004

(54) APPARATUS AND METHOD FOR A FIELD WINDING ASSEMBLY MOUNTABLE ON A ROTOR IN A SYNCHRONOUS MACHINE

(75) Inventors: Yu Wang, Clifton Park, NY (US); Richard Nils Dawson, Vooheesville, NY (US); Christopher Anthony Kaminski, Niskayuna, NY (US); Robert John Nygard, Saratoga Springs, NY (US); James Pellegrino Alexander, Ballston Lake, NY (US); John Arthur Urbahn, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/977,211

(22) Filed: Oct. 16, 2001

(65) Prior Publication Data
US 2003/0071535 A1 Apr. 17, 2003

(51) Int. Cl.[7] .................................................. H02K 0/55
(52) U.S. Cl. ........................ 310/208; 310/208; 310/261
(58) Field of Search ................... 310/208, 261

(56) References Cited

U.S. PATENT DOCUMENTS

| 5,532,663 | A |   | 7/1996 | Herd et al. ............... 335/216 |
|---|---|---|---|---|
| 5,774,032 | A |   | 6/1998 | Herd et al. ............... 335/216 |
| 5,777,420 | A |   | 7/1998 | Gamble et al. ........... 310/261 |
| 6,066,906 | A |   | 5/2000 | Kalsi ........................ 310/179 |
| 6,140,719 | A |   | 10/2000 | Kalsi .......................... 310/52 |
| 6,166,473 | A | * | 12/2000 | Hayasaka ................. 310/216 |
| 6,169,353 | B1 |   | 1/2001 | Driscoll et al. ........... 310/261 |
| 6,239,527 | B1 |   | 5/2001 | Kaminski et al. ......... 310/175 |
| 6,437,476 | B1 |   | 8/2002 | Nygard et al. ............ 311/216 |
| 6,483,220 | B1 | * | 11/2002 | Johnson .................... 310/179 |
| 2003/0011253 | A1 |   | 1/2003 | Kalsi et al. |
| 2003/0011452 | A1 |   | 1/2003 | Snitchler et al. |

FOREIGN PATENT DOCUMENTS

JP        359198868 A  * 11/1984   ......... H02K/55/04

* cited by examiner

Primary Examiner—Thomas M. Dougherty
Assistant Examiner—Iraj A. Mohandesi
(74) Attorney, Agent, or Firm—Nixon & Vanderhye, P.C.

(57) ABSTRACT

A winding assembly for a rotor is disclosed comprising a plurality of rotor field windings and a field support holding said plurality of windings in said winding assembly, wherein the winding assembly is mountable on said rotor.

17 Claims, 5 Drawing Sheets

APPARATUS AND METHOD FOR A FIELD WINDING ASSEMBLY MOUNTABLE ON A ROTOR IN A SYNCHRONOUS MACHINE

BACKGROUND OF THE INVENTION

The present invention relates to rotors in synchronous machines. In particular, the invention relates to supports for a rotor field winding in generators.

Conventional generators have rotors that support field windings. These rotors typically have rotor cores with axial slots that receive each turn of the field windings. These rotor slots restrain the windings against the centrifugal forces that arise as the rotor spins. During assembly, the winding is installed turn by turn in the slots of the rotor core. The winding is assembled as it is installed in the slots of the rotor core. Assembling the winding as it is installed in the rotor core is inefficient, time consuming and requires highly-skilled technicians. There is a need for an improved method of installing a field winding in the rotor core of a generator.

BRIEF SUMMARY OF THE INVENTION

A modular field winding support system has been developed. This system allows for pre-formed winding turns to be installed in a rotor core. The modular support system includes a series of winding spacers that hold each of the winding turns. These spacers are laterally spaced along the long side of the windings. Each spacer holds a plurality of windings. A group of spacers collectively hold a nested assembly of windings. The winding spacers and hence the windings are secured to a rotor core by a locking mechanism. A rotor core may support a pair of opposite assemblies of windings.

The winding spacers are fitted to the pre-fabricated windings prior to their assembly with the rotor core. The winding spacers have some flexibility to adjust to variances in the winding turns and the rotor core. The pre-fabricated winding turns and winding spacer assembly is mounted on the rotor core. A locking mechanism secures the winding support and the winding turns to the rotor core.

In a first embodiment, the invention is a winding assembly for a rotor comprising: a plurality of rotor field windings, and a winding support holding said winding in a slot of the support, wherein the winding assembly is mountable on said rotor.

In another embodiment, the invention is a winding assembly for a rotor core comprising: an array of field windings arranged in an array, each of said windings having a pair of opposite long sides, and a pair of opposite end sections and a plurality of winding spacers supporting the long sides of said field windings, said winding spacers each having a first edge and a second edge, wherein each of said first edges slidably engage a respective spacer slot on a first surface of the rotor core, and each of said second edges engage a respective spacer slot on a second surface of the rotor core.

In a further embodiment, the invention is a method for assembling a plurality of field windings and securing the windings on a rotor core comprising the steps of: arranging a plurality of field windings in a winding assembly using a plurality of spacers to hold the windings in the assembly, wherein each spacer has a plurality of slots and each slot receives one of said plurality of rotor windings; mounting the winding assembly on the rotor core by inserting edges of the plurality of spacers into slots on the rotor core, and securing the edges of the plurality of spacers to the rotor core.

DETAILED DESCRIPTION OF THE INVENTION

Figure 1:
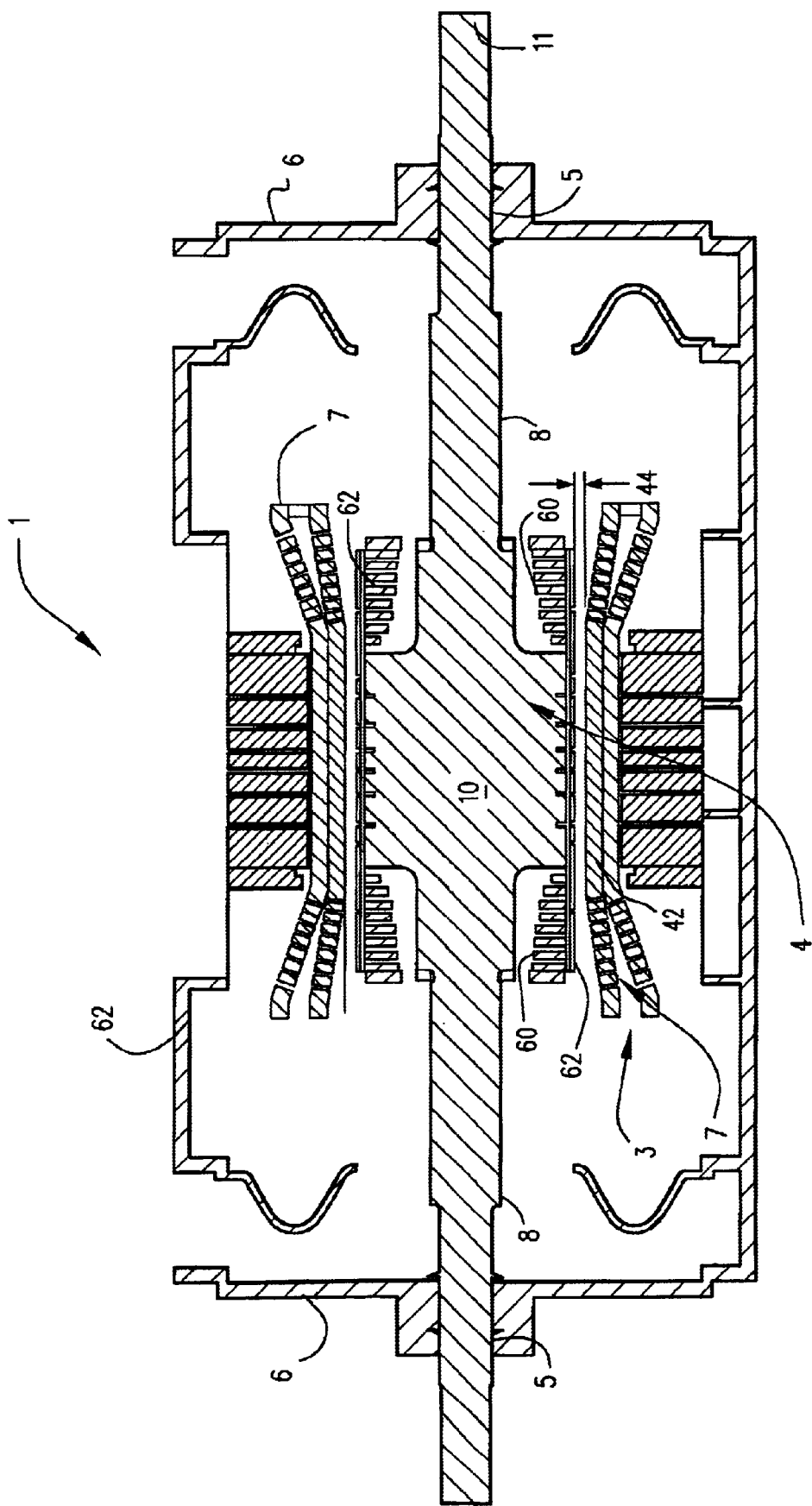
FIG. 1 is a cross-sectional diagram of a generator having a rotor and stator.

FIG. 1 is a cross-sectional diagram of an exemplary generator 1 having a stator 3 and a rotor 4. The rotor is supported on bearings 5 in a generator housing 6. The stator includes an annular array of armature windings (stator coils) 7 that form a cavity for the rotor.

Figure 2:
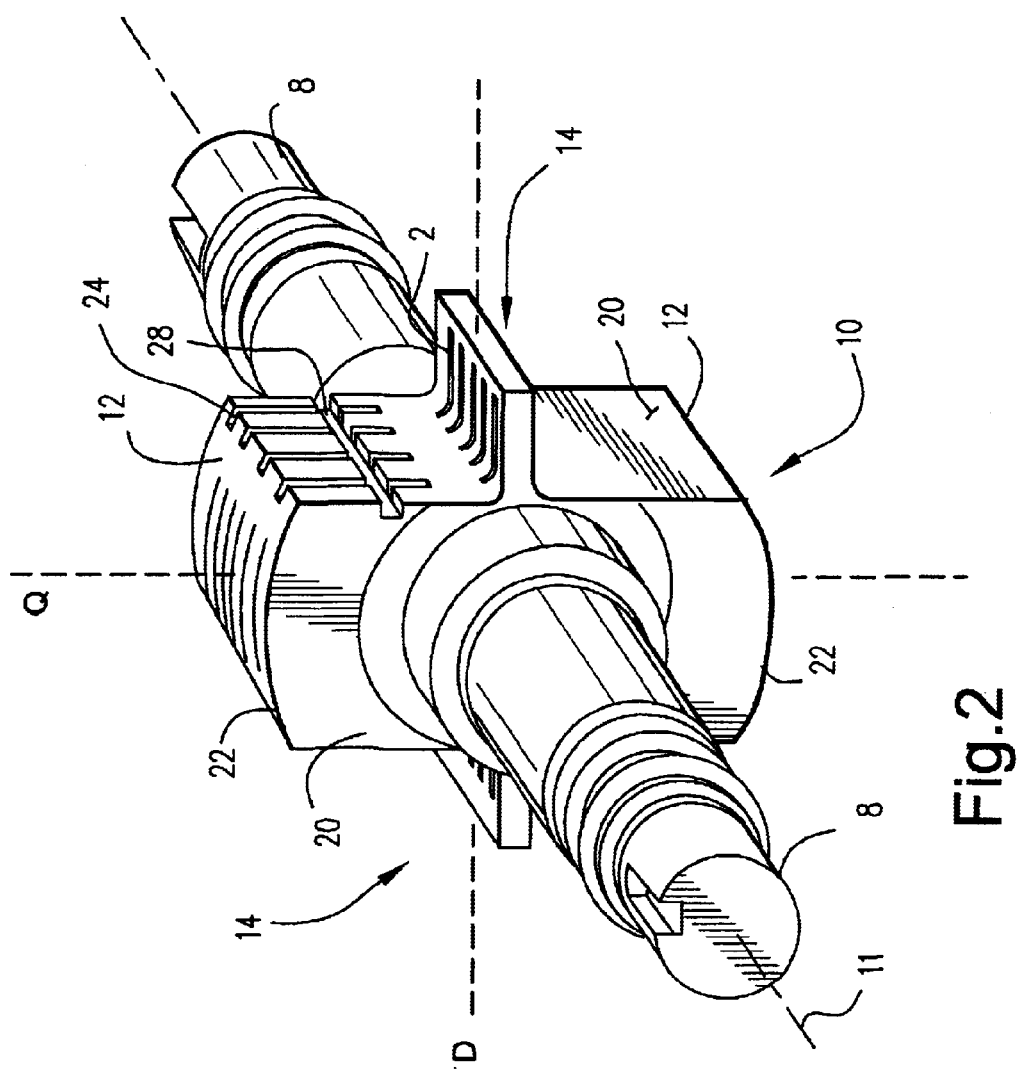
FIG. 2 is a perspective view of the rotor from the generator, wherein the rotor lacks field winding assemblies.

FIG. 2 is a diagram of a rotor 4 having a generally rectangular rotor core 10 with opposite pole surfaces 22 arranged along a Q-axis. The rotor core includes fins 14 arranged along the D-axis of the core. The rotor core 10 is supported by rotor end shafts 8 that are axially (along the center-axis 11) aligned with the rotor core. The end shafts are supported by bearings 5. The end shafts may connect to a drive coupling to a power turbine and to an electrical collector.

The rotor core 10 may be formed of an iron forging. The rotor fins 14 of the rotor core may be formed in any suitable manner, including being integral with the rotor core forging by being machined or forged from the rotor forging, cast with the rotor forging, or welded to the rotor forging. Alternatively, the fins 14 may be mechanically secured to the rotor core forging using dovetails or the like.

The rotor core is semi-rectangular in cross section and has a pair of opposite flat surfaces 20 and a pair of opposite arc-shaped surfaces 22. The fins 14 extend upright from the longitudinal center of the flat surfaces of the rotor core. The flat surfaces each have a series of spacer slots 24 (see FIG. 3) that are orthogonal to the center axis 11. These spacer slots are open at the edge of the flat surface adjacent the arc surfaces 22 so that the edges of winding spacers 26 may slide into these slots.

In addition, the rotor flat surfaces 20 each include a locking slot 28 parallel to the center axis 11. The locking slot intersects the spacer slots 24 on the rotor flat surface. The locking slot slidably receives a locking bar 30 that secures the spacers to the rotor core. The spacer bar is positioned in the locking slot such that notches 36 on the bar are aligned with the slots on the rotor flat side. Once the spacers have been inserted into the spacer bar, the bar is moved laterally in the locking slot to engage and secure with locking notches 38 in the edges of the spacers. The fins 14 of the rotor also have spacer slots 32 to receive an opposite end of the spacers 26. The spacer slots 32 in the fins may have closed ends 34. As the edges of the spacers are inserted into the fin slots, the opposite edges of the spacer slide into the open-ended slots on the flat side of the rotor core.

The arc-shaped surfaces 22 of the rotor core have apertures 88 to receive connections for a shield 62 (FIG. 1). At least a portion of the arc surfaces 22 extend to the surface of the cylindrical envelope 40 formed by the rotation of the rotor core. This envelope is nearly the same diameter as the rotor cavity formed in the stator. An annular air gap 44 is formed between the rotor cylindrical envelope 40 and the rotor cavity surface in the stator. The outer edge 48 of the fins, need not extend to the enclosure, but may be slightly short of the envelope to facilitate mounting a rotor enclosure onto the rotor core. The outer peripheral surfaces 49 of the windings, and the arc surfaces 22 of the rotor core extend to the cylindrical envelope surface.

Figure 3:
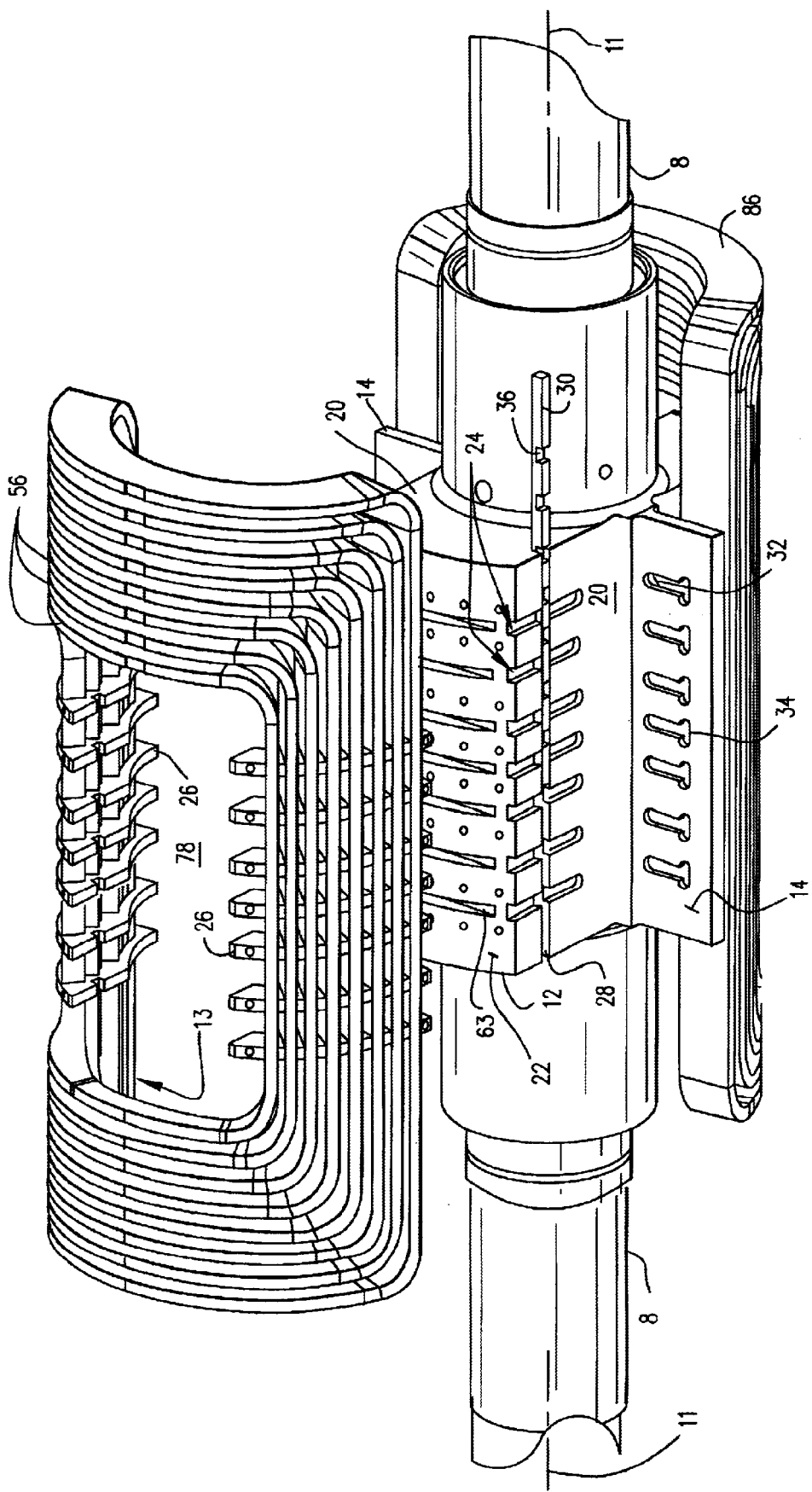
FIG. 3 is an assembly drawing showing a rotor assembly incorporating the field winding and spacer assembly.

FIG. 3 is a perspective view of a field winding assembly 13 being mounted on the rotor core 10. The winding assembly is prefabricated with spacers before being mounted on the rotor core. The winding assembly 13 is aligned with the rotor core such that the center open area 78 of the windings is above the semi-rectangular rotor core and coaxial with the Q-axis of the core. The edges of the spacers 26 in the winding assembly are aligned with the slots 24 on the flat surfaces 20 of the rotor core. A hoist or other mechanical lifting device may be used to move the winding assembly over the rotor core.

As the winding assembly is lowered onto the rotor core, edges 72 of the spacers slide into the core slots 24. The spacers are arranged on both sides 59 of the windings. The spacers on each winding side slide into respective core slots 24 on both sides of the core surfaces 20. The locking bars 30 on both of the opposite core surfaces 20 are positioned in the locking slots 28 such that the notches 80 on the locking bar are aligned with the slots 24 on the flat surfaces 20. The edges 72 of the spacer slide into the rotor slots 24, past the locking bar and seat in the rotor core slots 24. The locking bar aligns the spacers with respect to the rotor slots 24.

As the edges 72 of the spacer near the bottom of the rotor core slots, the opposite edges 76 of the spacer are inserted vertically into the spacer slots 32 on the fins. The upper end 34 of the fin slots 32 are expanded to allow an adjustment tool to facilitate the insertion of the spacer edge 76 into the fin slot. The spacers are flexible and may be slightly deformed to fit into the slots of the fin and/or the rotor core. Once the edges 72, 76 of all of the spacers have been fully seated in their respective slots in the rotor core or fin, the locking bar is moved laterally slightly in the locking slot so as to secure the spacers and hence the field winding assembly to the rotor core.

A winding assembly 86 that is fully seated on the rotor core is shown on the lower half of the FIG. 3. During assembly, once the winding assembly is seated and secured to the rotor, the rotor may be turned halfway around so that a second winding assembly can be lowered vertically onto the rotor core. While a two-winding assembly arrangement is shown here, other embodiments of the winding/rotor assembly may have one or three or more winding assemblies mounted on the rotor.

Figure 4:
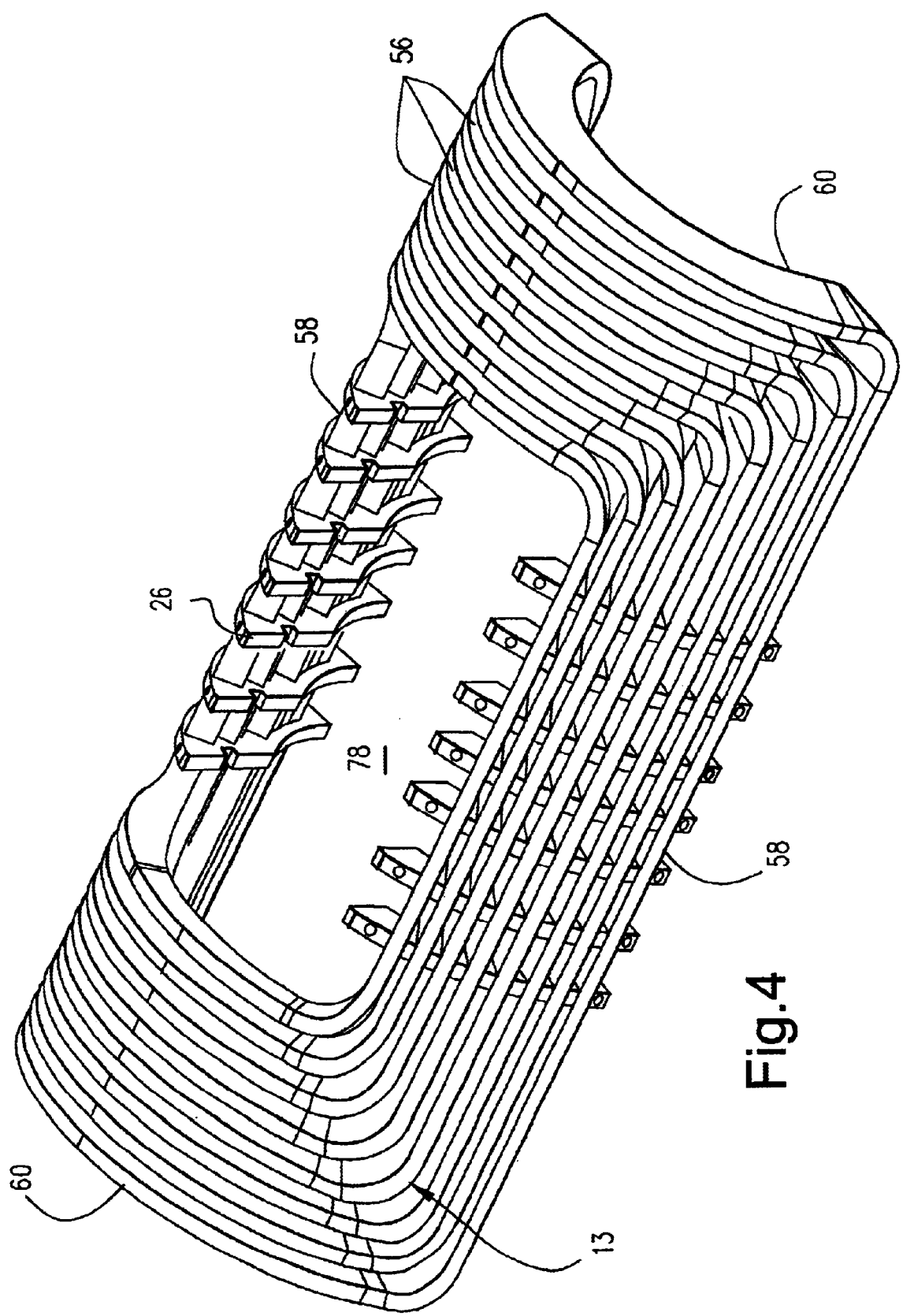
FIG. 4 is a perspective view of a field winding and spacer assembly.

FIG. 4 is a perspective view of a field winding assembly 13. The winding spacers 26 for each assembly 13 hold the individual rotor field windings 56 in an array having a generally half-cylindrical shape. The windings are nested one winding within another winding in the winding assembly 13. The nested array of field windings 56 are held to the rotor by the spacers 26 arranged on opposite sides 58 of the windings.

The winding assembly 13 may be pre-formed before being mounted on the rotor core 10. The field windings 56 may be formed of copper or other highly-conductive material. Each winding may 56 have a racetrack shape, but other winding shapes may be employed such as a saddle shape. The racetrack windings 56 each have a pair of straight long sides 58, and a semi-circular end section 60. The long sides 58 of the windings are supported by a, the spacers 26 on the rotor core. The spacers are distributed along the length of each side 58 of the winding array.

The end sections 60 of the windings extend laterally beyond the rotor core and over a portion of the end shaft sections (see FIG. 1). The end winding sections 60 may be contained by an cylindrical composite enclosure shield 62 (FIG. 1) that fits over the outer surface of the rotor core and extends laterally beyond each end of the rotor core to cover the end sections 60 of the field windings.

Figure 5:
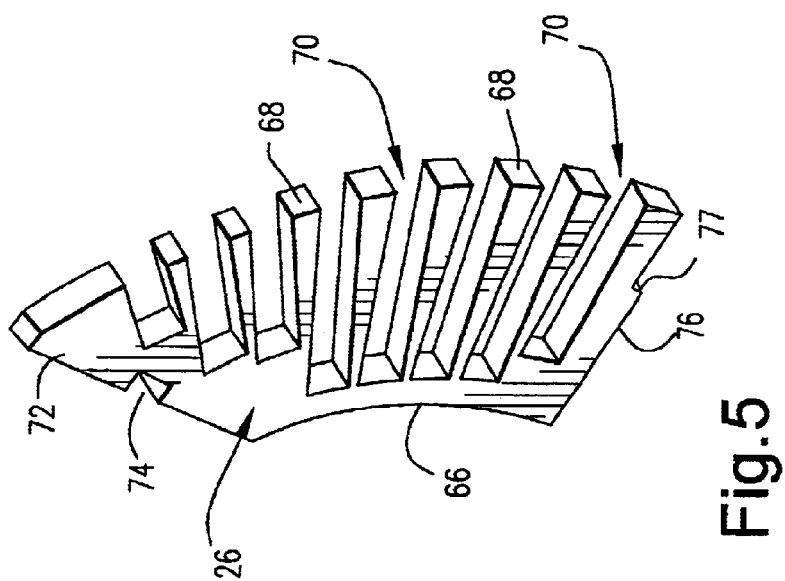
FIG. 5 is a perspective view of a spacer.

FIG. 5 is a perspective view of a spacer 26 that has a quarter-disk shape 66 with teeth 68 and slots 70 between the teeth. The spacers may be formed of a metallic material or a non-metallic material, such as a composite material. The slots 70 formed between the teeth of the spacers each receive a winding. The depth of each slot in the spacer is selected so as to receive the assigned winding 56 for the slot, and to position the outer periphery 49 of the winding at the edge of the cylindrical envelope 40 of the rotor. As the windings are inserted into the slots of each spacer, the slots 70 in the spacer may slightly pinch together (due to the presence of adjacent windings) and secure the windings in the slots of the spacer.

The spacers are distributed along the long sides 58 of the windings so as to be aligned with the slots 24 on the rotor core and the spacer slots 32 on the fins of the rotor core. In this regard, the spacers may slide laterally along the field windings so as to align with the slots in the rotor. In addition, the spacers may be ductile so as to flex to accommodate variations in field windings, and in the slots in the rotor core and fins.

The inside edge surfaces of the spacers 26 conform to the surfaces of the flat surface 20 of the rotor core and the fin 14 surface. The spacer edge 72 that abuts the flat surface 20 of the rotor is generally a straight edge to fit into the slot 24 on the rotor core. This edge slides into the slot on the rotor core as the winding assembly is inserted onto the rotor core. A notch 74 on the edge 72 of the spacer aligns with the locking slot 28 on the rotor core. This notch engages the locking bar 30 to secure the spacer and hence winding assembly 13 to the rotor core. The other edge 76 of the spacer fits into the spacer slot 32 on the fins. This edge may have a ledge 77 that engages the end of the spacer slot in the fin. This other edge 76 is inserted into the fin spacer slot 32 perpendicular to the slot (as the opposite edge of the spacer slides in parallel to the slot 24 on the rotor flat surface).

Figure 6:
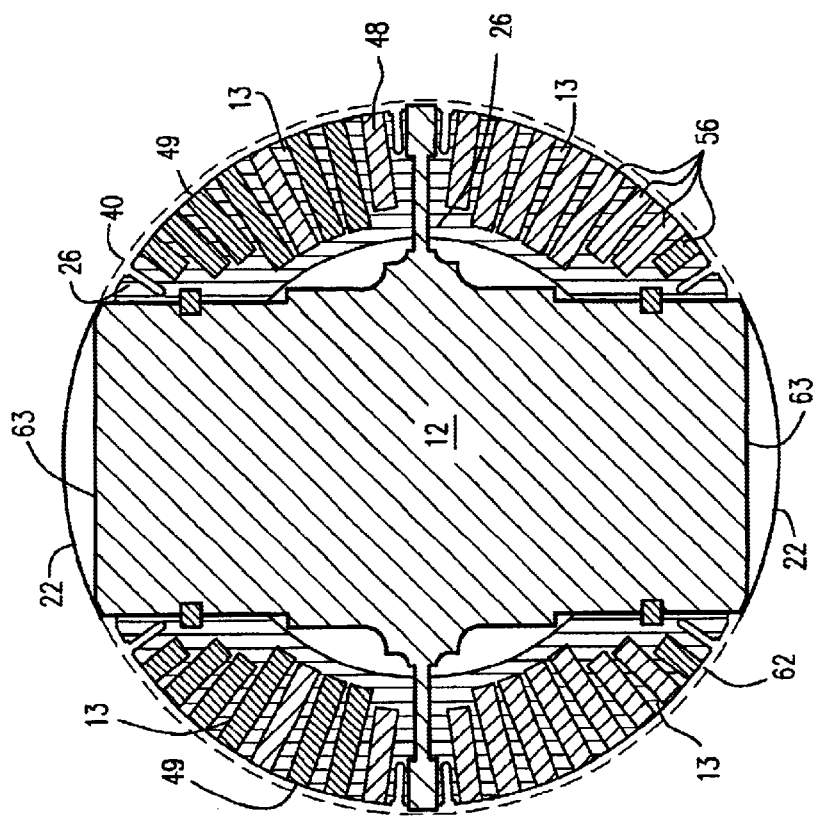
FIG. 6 is a cross-sectional diagram of the rotor with a pair of field winding and spacer assemblies.

FIG. 6 shows in cross section a rotor core 12 and winding assembly. The cross-section is through the rotor core at a slot 63 in the arc-shaped pole face 22 of the core. The two winding assemblies 13 (one winding assembly in the upper half of the figure, and a second winding assembly in the lower half of the figure) are supported on the rotor core so as to form a circular array of rotor field windings. The rotor core 12 supports the field winding and spacer assemblies 13 in an annular array of two winding assemblies 13 around the central axis 11 of the rotor. The outer periphery 49 of the windings extends to the end of the cylindrical envelope 40 formed by the rotor core.

Figure 7:
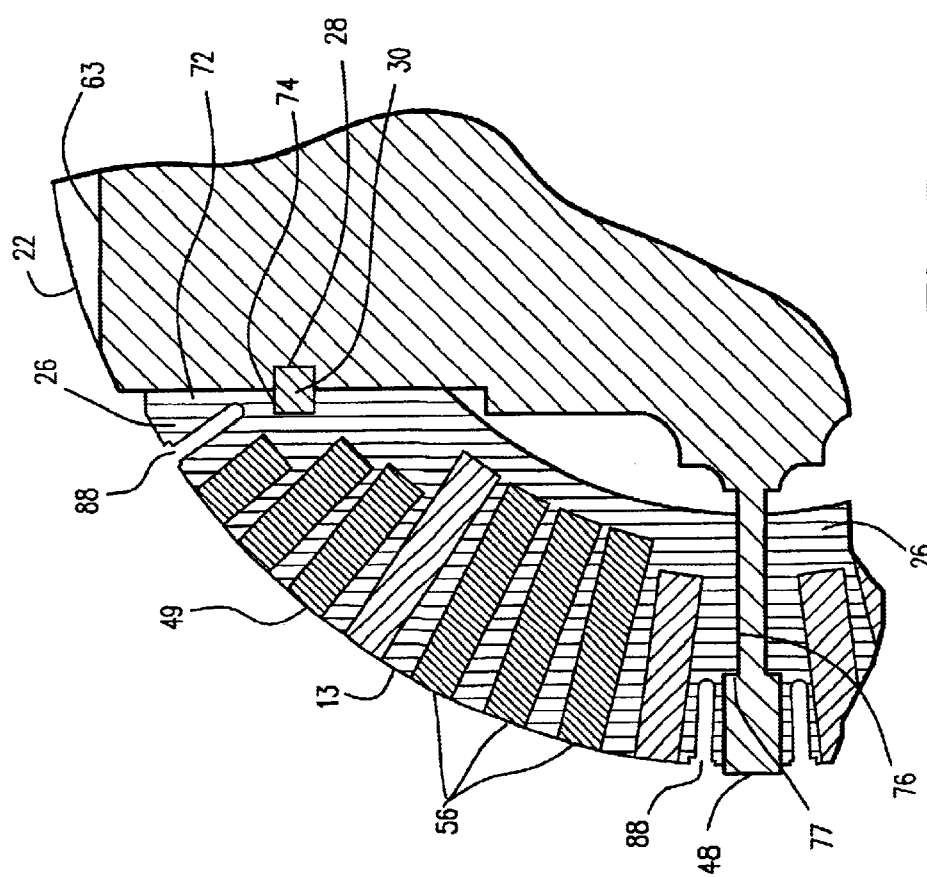
FIG. 7 is an enlarged cross-sectional diagram showing a quarter-section of the rotor with a field winding and spacer assembly.

FIG. 7 is an enlarged cross section of a quarter-section of rotor core and a single winding assembly 13. The locking bar 30 secures each spacer 26 to the rotor core, and the ledge 77 on the other edge of the spacer engaging the spacer slot 32 on the fin. Each winding 56 is seated in a spacer slot 79 such that the upper edge of the winding extends to the cylindrical envelope 40 of the rotor. A composite enclosure shield 62 (FIG. 1) may wrap around the rotor core and winding assembly. The spacers have threaded bolt holes 88 to receive bolts that hold the shield to the winding assembly. Similarly, the arc-shaped portion of the rotor core may have bolt holes for bolts that hold the shield to the rotor core.

The spacers 26 are one embodiment of a winding support that holds a rotor field winding that may be assembled with the winding, before the support and winding are mounted on the rotor core. The winding support is not an integral part of the forging. Once mounted on the rotor core, the winding support could be permanently attached to the forging (e.g., welding) or detachably connected to the forging, such as via the locking mechanisms disclosed here. The support could be separate spacers or an integrated assembly.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A winding assembly for a rotor comprising:
   at least one rotor field winding arranged on a periphery of the rotor;
   a winding support mounted on the slot rotor periphery having a slot receiving said at least one winding, wherein said winding support includes at least one edge;
   wherein said winding assembly is mountable on said rotor, and said rotor has a rotor slot to receive the edge of the winding support.

2. A winding assembly as in claim 1 wherein said at least one rotor field winding is a plurality of windings and the winding support has a plurality of teeth and a plurality of slots between said teeth, and further each of said slots receives one of said plurality of windings.

3. A winding assembly as in claim 1 wherein said winding support includes at least one spacer, having edges that engage slots on at least one surface of the rotor, and said slots are transverse to a centerline of the rotor, wherein said spacer is thin relative to a length of the rotor.

4. A winding assembly as in claim 3 wherein said at least one spacer has a quarter-disk shape, and has radial slots to receive said windings.

5. A winding assembly as in claim 4 wherein each of said plurality of rotor windings has a long side that fits into one of said radial slots of said spacer.

6. A winding assembly for a rotor comprising:
   at least one rotor field winding arranged on a periphery of the rotor;
   a winding support mounted on the rotor periphery having a slot receiving said at least one winding;
   wherein said winding assembly is mountable on said rotor and wherein said winding support further includes at least one spacer, having edges that engage slots on at least one surface of the rotor, and said slots are transverse to a centerline of the rotor, and
   further wherein said winding assembly further comprises a locking bar engaging a notch on an edge of said at least one spacer, and said locking bar slidably engages with a locking slot on said surface of the rotor, wherein said locking slot is parallel to said center line of the rotor.

7. A winding assembly as in claim 1 wherein said winding support comprises a plurality of winding supports distributed along opposite sides of said plurality of windings.

8. A winding assembly as in claim 7 wherein said opposite sides of said plurality of windings are mountable to encircle a rotor core section, said at least one surface of said rotor core includes opposite surfaces of the rotor core section, and said spacers are collectively engageable with both of said opposite surfaces of the rotor core section to secure the winding assembly to the rotor core section, wherein said windings extend beyond an end of the rotor core section.

9. A winding assembly mountable on a periphery of a rotor core comprising:
   an array of field windings arranged in an array, each of said windings having a pair of opposite long sides, and a pair of opposite end sections, wherein said long sides are mountable proximate to opposite side of the rotor and said end sections are mountable proximate to opposite ends of a rotor;
   a plurality of winding spacers supporting the long sides of said field windings, said winding spacers each having a first edge and a second edge,
   wherein each of said first edges slidably engage a respective spacer slot on a first surface of the rotor core, and each of said second edges engage a respective spacer slot on a second surface of the rotor core.

10. A winding assembly as in claim 9 wherein the first surface of the rotor core is orthogonal to the second surface of the rotor core.

11. A winding assembly for a rotor core comprising:
    an array of field windings arranged in an array, each of said windings having a pair of opposite long sides, and a pair of opposite end sections;
    a plurality of winding spacers supporting the long side of said field windings, said winding spacers each having a first edge and a second edge,
    wherein each of said first edges slidably engage a respective spacer slot on a first surface of the rotor core, and each of said second edges engage a respective spacer slot on a second surface of the rotor core, and
    wherein the first surface of the rotor core has a locking slot transverse to the spacer slot on the first surface, and said assembly further comprises a locking bar slidably engaging the locking slot.

12. A winding assembly as in claim 11 wherein said locking bar engages a notch on an edge of said at least one spacer, and said locking slot is parallel to a centerline of the rotor.

13. A winding assembly as in claim 9 wherein each of said plurality of rotor windings is seated in a respective slot of each spacer, and the spacer slots are radially aligned with the rotor core.

14. A winding assembly as in claim 9 wherein said plurality of windings are mountable to encircle a rotor core section, said at least one surface of said rotor core includes opposite surfaces of the rotor core section, and said spacers are collectively engageable with both of said opposite surfaces of the rotor core section to secure the winding assembly to the rotor core section, and wherein said end sections of the windings extend laterally beyond the rotor core.

15. A winding assembling for a rotor having a cruciform cross-section, said assembly comprising:
    wherein the first rotor field winding and first winding support are mountable on a first lateral peripheral side of the rotor and the second rotor field winding and second winding support are mountable on a second lateral peripheral side of the rotor.

16. A winding assembly as in claim 15 wherein said curciform cross-section of the rotor ahs a first ridge and third ridge, opposite to the first ridge, and a second ridge and a fourth ridge, opposite to the second ridge, and wherein aid first ridge extends radially through a aperture in the first rotor field winding and said third ridge extends radially through an aperture in the second rotor field winding.

17. A winding assembly as in claim 15 wherein said second and third ridges separate the first and second rotor field windings.

* * * * *